United States Patent [19]
Zook

[11] 3,736,046
[45] May 29, 1973

[54] OPTICAL SPOT SIZE CHANGER
[75] Inventor: James D. Zook, Burnsville, Minn.
[73] Assignee: Honeywell Inc., Minneapolis, Minn.
[22] Filed: Apr. 15, 1971
[21] Appl. No.: 134,245

[52] U.S. Cl............346/74 MT, 346/76 L, 350/150, 350/157, 350/160 R
[51] Int. Cl...........................G01d 15/12, G02f 1/26
[58] Field of Search.....................350/147, 150, 157, 350/160, 175 DR, DIG. 2; 346/74 MT, 76 L

[56] References Cited
UNITED STATES PATENTS

| | | | |
|---|---|---|---|
| 3,424,513 | 1/1969 | Lotspeich | 350/175 DR |
| 3,541,471 | 11/1970 | Kaminow et al. | 350/160 R |
| 3,512,876 | 5/1970 | Marks | 350/150 |
| 3,527,532 | 9/1970 | Macken | 350/150 |
| 3,530,301 | 9/1970 | Boyd et al. | 350/157 |
| 3,485,553 | 12/1969 | Lee | 350/150 |
| 3,505,658 | 4/1970 | Fan et al. | 350/150 |
| 2,030,235 | 2/1936 | Walton | 350/150 |
| 3,200,697 | 8/1965 | Goubau | 350/150 |
| 3,461,402 | 8/1969 | Dumanchin | 350/150 |
| 3,575,487 | 4/1971 | Ohm et al. | 350/150 |

OTHER PUBLICATIONS

Vavilov et al., "The Effect of a Strong Electric Field on the Absorption of Light by Silicon" Soviet Phys. Sol. State, Vol. 2, No. 8 (8–1960) pp. 1746–1747
Kaminow et al., "Electrooptic Light Modulators" App. Optics Vol. 5, No. 10 (10–1966) pp. 1612–1628

*Primary Examiner*—John K. Corbin
*Attorney*—Lamont B. Koontz, Omund R. Dahle and David R. Fairbairn

[57] ABSTRACT

In a beam-addressed optical memory, the size of the focused light spot is electrically controlled to provide successively larger spot sizes for reading, writing and erasing. A body of material having electric field controllable optical properties which are capable of altering the intensity distribution or the wave front shape of the light beam is positioned between the light source and the focusing means. Electrodes controllably apply a non-uniform electric field to the body such that a non-uniform change in the intensity distribution or the wave front shape of the light beam occurs, thereby causing a change in the size of the focused light spot.

15 Claims, 16 Drawing Figures

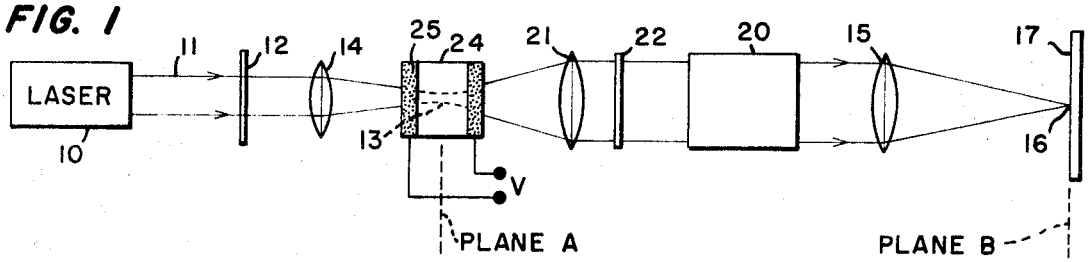
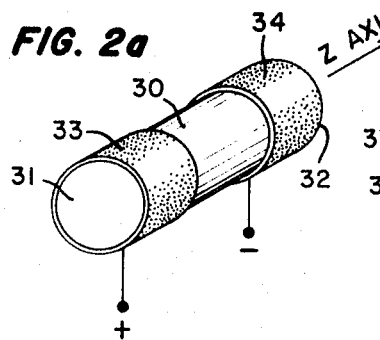
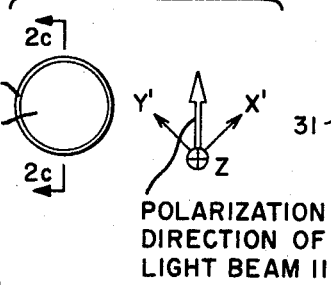
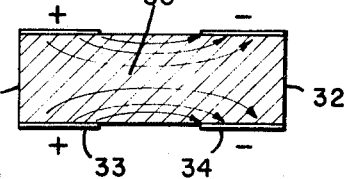
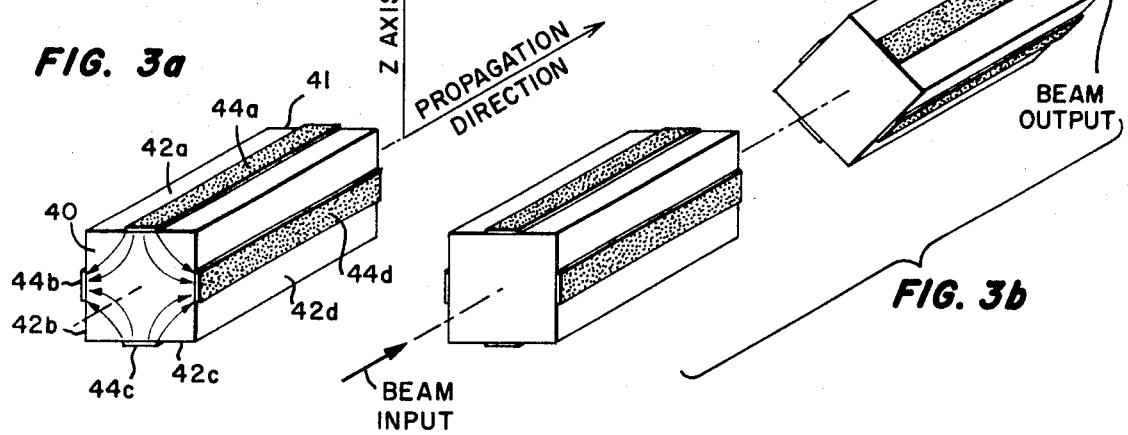
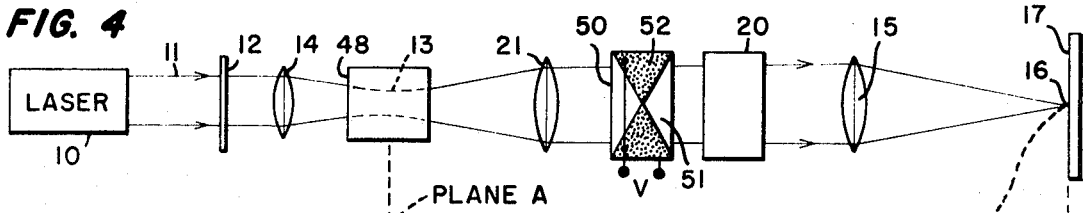
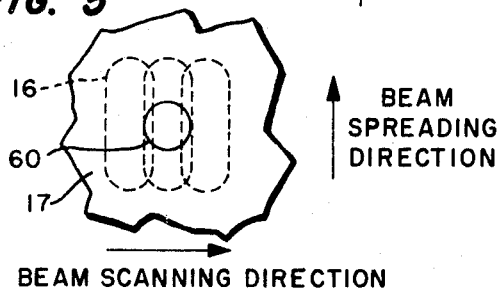
INVENTOR.
JAMES D. ZOOK
BY Osmund R. Dahle
ATTORNEY.

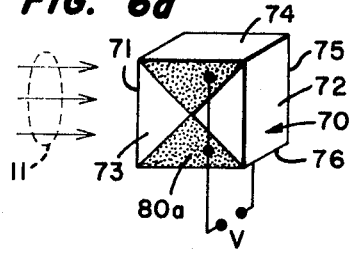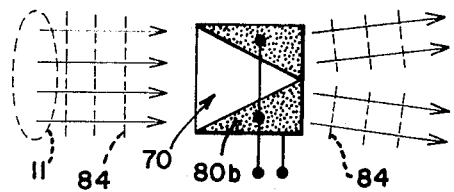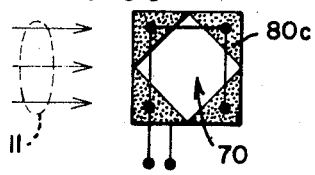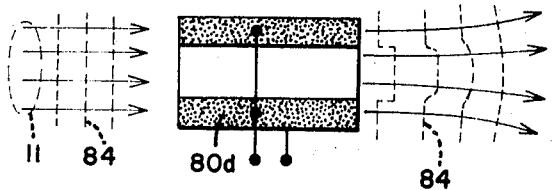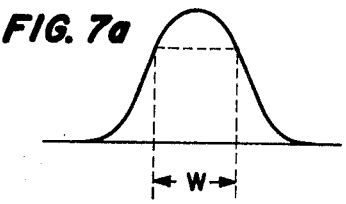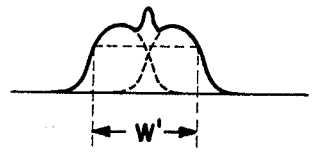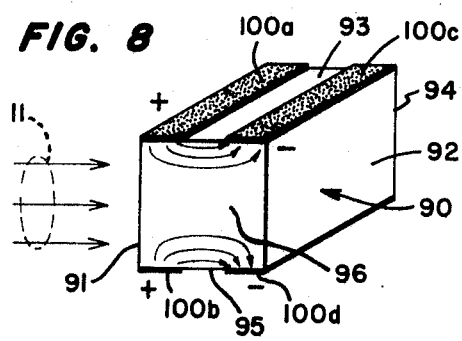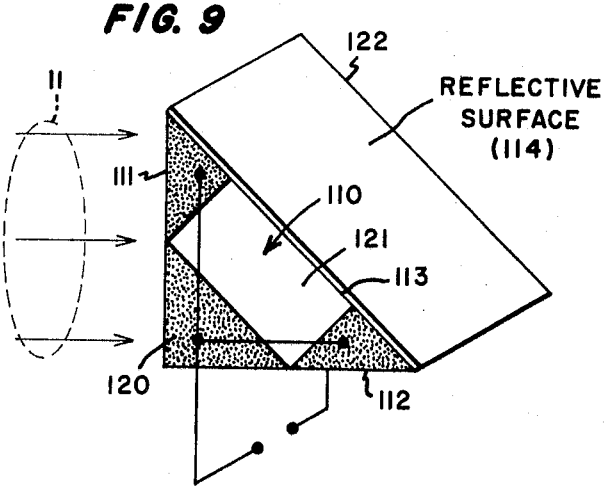
INVENTOR.
JAMES D. ZOOK
BY Omund A. Dahle
ATTORNEY.

3,736,046

OPTICAL SPOT SIZE CHANGER

BACKGROUND OF THE INVENTION

The present invention is directed to an optical device for changing the size of a focused light spot in response to an applied field. As used in this application, the term "light" means electromagnetic waves within the frequency band including infrared, visible and ultraviolet light.

In many optical systems, it is highly desirable to change the size of a focused light spot in a rapid manner. In the prior art, the spot size changing has been accomplished by mechanically driven zoom lenses, which are incapable of high speed changes required for many applications.

In particular, rapid spot size changing can be used to great advantage in a beam-addressed optical mass memory. One example of such a memory is the Curie point system shown by L. D. McGlauchlin et al U. S. Pat. No. 3,368,209 which is assigned to the same assignee as the present application. In this system, a laser beam heats discrete portions of the thin magnetic material above the Curie temperature thereby altering the magnetization direction at that point. The system retrieves stored information by attenuating the laser beam to permit non-destructive readout using the Faraday or Kerr effect. The information stored on the film can be erased by preheating portions of the film desired to be erased above the Curie temperature with the laser beam and simultaneously applying a magnetic field.

A controllable focused spot size is desirable in a beam addressed optical mass memory for two reasons. First, the danger of incomplete erasure due to misregistration can be avoided by erasing a larger spot than was written. Second, the read signal can be enhanced by using a smaller spot for reading than for writing. This is due to the fact that the focused spot has a non-uniform intensity distribution such as a Gaussian distribution and therefore only the center portion of the spot is heated above the writing temperature, and spots smaller than the beam diameter are written. During reading, it is desirable to have a spot no larger than the written spot since light outside the edge of the written spot sees the unwritten film, and gives a signal which subtracts from the read signal.

One approach to high speed changing of the size of a focused light spot is described in a co-pending patent application Ser. No. 134,246 entitled "Optical Polarization Spot Changing Devices" by Enrique Bernal G. which was filed on even date herewith and which is assigned to the same assignee as the present application. In this approach the spot size is changed by selectively directing the light beam over a first or a second path. The paths represent different optical distances from the beam waist to the focusing means. Although this apparatus has several advantages, it requires several optical elements and provides only two different spot sizes. In many beam-addressed optical mass memories, it is advantageous to have three different spot sizes, one for reading, writing and erasing, respectively.

SUMMARY OF THE INVENTION

The optical device of the present invention includes a body of material having electric field controllable optical properties capable of altering a characteristic of the light beam which is positioned between the light source and the focusing means. The characteristic of the light beam which can be altered by the body of material is either the intensiy distribution or the wave front shape of the light beam. Electrode means controllably apply a non-uniform electric field to the body of material such that a non-uniform change in the characteristic of the light beam occurs, thereby causing the change in the size of the focused light spot.

BRIEF DESCRIPTION OF THE DRAWINGS

FIG. 1 shows an optical system including an optical device of the present invention located essentially at the beam waist.

FIGS. 2a, 2b, and 2c show isometric, end and cross-sectional views, respectively, of an optical spot size changer formed from a right cylindrical body of electro-optic material.

FIGS. 3a and 3b show optical spot size changers formed from a single rectangular parallelepiped of electro-optic material and from two rectangular parallelepipeds of electro-optic material.

FIG. 4 shows an optical system including another embodiment of the optical spot size changer of the present invention located between the beam waist and the focusing means.

FIG. 5 shows the erasing of a Curie point written spot with the system shown in FIG. 4.

FIGS. 6a, 6b, 6c and 6d show optical spot size changers formed from a single body of electro-optic material which are capable of changing the focused spot size in one dimension.

FIGS. 7a and 7b show the intensity distribution of a focused light spot with and without beam spreading respectively.

FIG. 8 shows another one-dimensional spot size changer.

FIG. 9 shows a one-dimensional spot size changer formed from a triangular prism of electro-optic material.

DESCRIPTION OF THE PREFERRED EMBODIMENTS

In FIG. 1 is shown an optical system which contains the basic elements contained in a beam-addressed optical mass memory. A light source such as laser 10 provides a light beam 11. Polarizer means 12 causes light beam 11 to have a first polarization direction. Light beam 11 includes a beam waist 13 at plane A. Beam waist 13 may be caused by laser 10 or may be provided by a converging lens 14 as shown in FIG. 1. Focusing means 15 forms a focused light spot 16 at plane B, at which is located memory medium 17. Beam addressing means 20 selectively directs light beam 11 to various positions on memory medium 17. Beam addressing means 20 may comprise, for example, electro-optic, acousto-optic or mechanical light beam deflectors. Lens 21 receives light beam 11 as it emerges from beam waist 13 and causes the rays of light beam 11 to be substantially parallel. A second polarizer means, hereafter referred to as analyzer means 22 transmits that portion of light beam 11 which has the first polarization direction. Located essentially at beam waist 13 is an optical device for controllably changing the size of focused light spot 16. The device comprises a body 24 of material having electric field controllable optical properties capable of altering a characteristic, the intensity distribution, of light beam 11 at plane B. Electrode means 25 controllably apply a non-uniform electric field to body 24 such that a non-uniform change in the characteristic of light beam 11 occurs, thereby causing a change in the size or shape of focused light spot 16.

If a small circular aperture were introduced at plane A, the aperture would function as a spatial filter. In operation, the spot size changer controllably reduces the size of the effective aperture at plane A, thereby acting as an electric field controllable spatial filter. As the size of the aperture is decreased the intensity of light beam 11 decreases. At the same time, light beam 11 leaving the spot size changer spreads out in size, and focused light spot 16 at plane B shrinks in size. A reduction in the aperture at plane A continues to cause a reduction in the size of focused light spot 16 until light beam 11 is spread out in size to uniformly illuminate focusing means 15. At this point, focused spot 16 is said to be "diffraction limited" and is in the shape of an Airy disk. The diameter, $d$, of the Airy disk is given by the well-known relation $$d = 1.22 \lambda F$$

where $\lambda$ = the wavelength of light beam 11, and $F$ = the effective f-number of system.

If laser 10 were an ideal laser and if light beam 11 were not apertured at any place along its path, then focused light spot 16 would be a diffraction limited spot having a Gaussian energy distribution wider than the Airy disk. Thus reduction of the effective aperture at plane A by the spot size changer decreases the size of focused light spot 16. In addition, practical high power lasers are not capable of diffraction limited performance, but rather produce a focused light spot 15 which is also Gaussian in shape but larger than the diffraction limited spot size. This lack of diffraction limited performance by laser 10 allows the spot size changer to have an even greater effect in reducing the size of focused light spot 16.

Fig. 2a is a preferred embodiment of the present invention in which the body of material 24 shown in FIG. 1 comprises a right cylindrical body of electro-optic material having either the $\overline{42}m$ or the $\overline{43}m$ type of point symmetry (Hermann-Manguin notation). Examples of materials having the $42m$ symmetry are potassium dihydrogen phosphate (KDP), potassium dideuterium phosphate (KD*P) and ammonium dihydrogen phosphate (ADP). Materials having the $43m$ type of point symmetry include gallium arsenide (GaAs), zinc sulphide (ZnS) and zinc telluride (ZnTe). The right cylindrical body has a cylindrical surface 30, a first face 31, through which light beam 11 enters the body and a second face 32 through which light beam 11 emerges from the body. A first electrode 33 is attached to and extends around cylindrical surface 30 proximate to first face 31, while a second electrode 34 similarly is attached to and extends around cylindrical surface 30 proximate to second face 32.

FIG. 2b shows an end view of the device shown in FIG. 2a in which the particular electro-optic material used is KD*P. The direction of propagation of light beam 11 coincides with the crystallographic Z axis of the body. In addition, light beam 11 is preferably polarized in the plane of, and at 45° to, the crystallographic X' and Y' axes in order to maximize the amount of phase retardation of light beam 11 through the body.

When an electric potential is established between electrodes 33 and 34, a non-uniform electric field is applied to the body. As shown in FIG. 2c which is a cross-sectional view of the device of FIG. 2a, the electric field parallel to the Z axis is small at the center of the body, and therefore only a small change in the phase relationship between the ordinary and extraordinary rays of the light beam occurs. However, at the regions near the surface 30 of the body the electric field is much larger, and therefore a change in the phase relationship between the ordinary and extraordinary rays occurs. In the system shown in FIG. 1, analyzer means 22 passes only that light polarized in the first polarization direction. Therefore, as the voltage between electrodes 33 and 34 is increased, the transmission through analyzer means 22 of the extremities of light beam 11 is reduced while at the center of light beam 11 there is only a small change in transmission. In addition, the overall intensity of light beam 11 after passing through analyzer 21 is reduced. Therefore, the optical device of the present invention functions as a modulator as well as a spot size changer. In some systems, however, it is desirable to employ a separate modulator as well as the optical spot size changer.

In FIG. 3a is shown another embodiment of the present invention utilizing a rectangular parallelepiped body of electro-optic material having the 3m or 4mm point symmetry. Examples of materials having the 3m point symmetry are lithium niobate (LiNbO$_3$) and lithium tantalate (LiTaO$_3$). Materials having the 4mm point symmetry include barium titanate (BaTiO$_3$) and strontium barium niobate (Sr$_x$Ba$_{1-x}$Nb$_2$O$_6$) commonly referred to as SBN. For simplicity it will be assumed hereafter that the particular electro-optic material shown in FIG. 3a is a lithium niobate crystal having a first face 40 through which light beam 11 enters the crystal and a second face 41 through which light beam 11 emerges from the body. The crystallographic Z axis is oriented perpendicular to the direction of propagation of light through the crystal. Upon each of the four sides of the crystal 42a, 42b, 42c and 42d respectively, is attached an electrode 44 which extends the length of the crystal.

In operation, a positive potential is applied to electrodes 44a and 44c on the first and third opposing sides 42a and 42c, while a negative potential is applied to electrodes 44b and 44d on the second and fourth opposing sides 42b and 42d. In this manner, a quadrupolar electric field is established within the body. The electric field established is zero at the center of the body and non-zero in the outer regions near the electrodes, thereby causing a reduction in the effective aperture of light beam 11 at plane A similar to that described for FIG. 2. However, the embodiment of FIG. 3a differs from that of FIG. 2 in that FIG. 2 causes a reduced effective aperture which remains circular in shape, while the device of FIG. 3a causes a reduced aperture which is non-circular. In those systems requiring that focused light spot 16 be essentially circular, a second electro-optic body identical to that shown in FIG. 3 but oriented 45° from that of the first body, as shown in FIG. 3b, may be positioned in the path of light beam 11 after the first body so as to make reduced effective aperture more nearly circular.

In another embodiment of the present invention, body 24 of FIG. 1 comprises a material having electro-absorptive properties, commonly known as the Franz-Keldysh effect. Such materials exhibit an increase in optical absorption for certain wavelengths of light in the presence of an applied electric field. Electrodes means 25 controllably apply a non-uniform electric field to the body such that greater absorption of the light occurs at the region of higher field intensity, and the effective aperture at plane A is reduced. Electrode configurations similar to those shown in FIGS. 2 and 3 may be used to create the non-uniform electric field within the electroabsorptive material. In this embodiment analyzer 22 is not required. In addition, polarizer 12 is not required in those embodiments using materials whose electro-absorptive effect is not polarization dependent.

In the foregoing embodiments of the present invention, the size of the focused light spot 16 is controllably reduced by causing a non-uniform change in the characteristic of light beam 11. This characteristic is the intensity distribution of light beam 11. In the following embodiments of the present invention, the size of focused light spot 16 is controllably increased. The increase in size is accomplished by causing a non-uniform change in another characteristic of light beam 11, the wave front shape.

Furthermore, in many applications it is sufficient to controllably increase the size of focused light spot 16 in one dimension only. In particular, a one-dimensional increase in size of focused light spot 16 is sufficient in beam-addressed optical memories in which there is relative motion between light beam 11 and memory medium 17. One example of such a memory is the rotating drum type in which memory medium 17 is attached to a rotating cylindrical drum. The rotation of the drum causes relative motion between light beam 11 and memory medium 17 in a first dimension and thereby achieves beam positioning in the first dimension. Therefore, two-dimensional beam positioning is accomplished by positioning light beam 11 in a second dimension essentially orthogonal to the first dimension. Similarly, it can be seen that the size of focused light spot 16 can be increased in the first dimension by increasing the duration of the impingement of light beam 11 on memory medium 17. Therefore, a two-dimensional increase in the size of focused light spot 16 is accomplished by " spreading out" light beam 11 at memory medium 17 in the second dimension.

Referring to FIG. 4, an optical system similar to that illustrated in FIG. 1 is shown. Numerals similar to those of FIG. 1 are used to designate similar elements. In FIG. 4, however, a modulator 48 of a type well-known in the art is positioned at beam waist 13 rather than the spot size changer 20 shown in FIG. 1. A one-dimensional spot size changer 50 comprising a body of electro-optic material 51 is positioned between beam waist 13 and focusing means 15. Electrode means 52 controllably apply a non-uniform electric field to the body 51. The application of a non-uniform electric field by electrode means 52 causes a non-uniform change, or distortion of the wave front shape of light beam 11. Distortion of the wave front shape results in interference at plane B and a one-dimensional increase in the size of focused light spot 16. The direction in which focused light spot 16 is increased by spot size changer 50 is hereafter termed the "beam spreading direction ". Beam scanning means 53 causes relative motion between light beam 11 and memory medium 17 in a direction essentially orthogonal to the beam spreading direction. In a rotating drum type beam-addressed optical memory, beam scanning means 53 comprises the apparatus which drives the cylindrical drum. In a non-rotating type system, scanning the light beam in a direction orthogonal to the beam spreading direction is accomplished either by an individual dither deflector or by the beam addressing means 20.

FIG. 5 illustrates the operation of the system of FIG. 4. By way of example, memory medium 17 is a thin film of manganese bismuth. The particular operation shown in Curie point erasing of a Curie point written spot 60. Focused light spot 16, shown by dotted lines is elongated in the beam spreading direction so that it is larger than the size of written spot 60. Focused light spot 16 is shown at three positions as light beam 11 is scanned in the beam scanning direction which is orthogonal to the beam spreading direction. The area of memory medium 17 exposed to light beam 11 is heated to a temperature greater than 360°C, the Curie temperature of manganese bismuth, and an external magnetic field is applied to align the magnetization direction of the heated portions as the portions cool to a magnetization direction similar to that of the surrounding area of memory medium 17. Since an area larger than the written spot 60 is erased, the danger of incomplete erasure due to mis-registration is substantially decreased.

The devices shown in FIGS. 6a, 6b and 6c each comprise a body 70 of electro-optic material in the form of a rectangular parallelepiped, having a first face 71 through which light beam 11 enters and a second face 72 from which light beam 11 emerges, and first, second, third and fourth sides 73, 74, 75 and 76 respectively. Upon first and third opposing parallel sides 73 and 75 respectively, are attached shaped electrodes 80 represented by the shaded regions. In each case shaped electrodes 80 comprise a plurality of triangular regions having minimum area at the center of first and third sides 73 and 75 and maximum area near the edges of first and third sides 73 and 75 which border second and fourth sides 74 and 76. However, shaped electrodes 80 may have non-triangular shape. In general, the wave front distortion is determined by the shape of the electrode and it is possible to design an electrode shape capable of producing any one of a variety of wave front distortions. One such electrode shape is shown in FIG. 6d.

In operation, when no electric field is applied to electro-optic body 70, light beam 11 passes essentially undisturbed through electro-optic body 70. When a voltage is applied to electrodes 80, the index of refraction of those portions of electro-optic body 70 between the electrodes changes. Light rays passing through the center of the electrooptic body 70 experience very little change in optical path due to the change in index of refraction whereas a large change in optical path is experienced near the second and fourth sides 74 and 76. Therefore, rays passing through electro-optic body 70 near the second and fourth sides 74 and 76 will experience a relative phase shift with respect to rays passing through the center of electro-optic body 70, thereby causing a non-uniform change in the wave front shape of light beam 11. FIG. 6b illustrates the change in shape of the wave fronts of light beam 11 after passing through the spot size changer. The distortion of wave fronts 84 causes the far-field pattern of light beam 11 to consist of two light beams diverging from one another. It is clear that if focusing means 15 is positioned proximate second face 72, the resulting focused light spot is increased in size and changed in shape due to interference of the two diverging beams.

FIG. 7 shows the energy distribution of focused light spot 16 in the system of FIG. 4 utilizing the one-dimensional spot size changer of FIG. 6b. FIG. 7a shows the Gaussian shaped spot present when no voltage is applied to spot size changer 50. The effective beam width is shown as W. FIG. 7b shows the energy distribution of focused light spot 16 when voltage is applied to spot size changer 50 thereby causing a non-uniform change in the wave front shape of light beam 11. It can be seen that the shape of the energy distribution of focused light spot 16 is the result of interference of portions of light beam 11 at plane B.

FIG. 8 shows another one-dimensional spot size changer utilizing a rectangular parallelepiped body of electro-optic material having first and second faces 91 and 92, and first, second, third and fourth sides 93, 94, 95 and 96 respectively. A first electrode 100a is attached to first side 93 proximate first face 91, a second electrode 100b is attached to third side 95 proximate first face 91, a third electrode is attached to first side 93 proximate second face 92, and a fourth electrode 100d is attached to third side 95 proximate second face 92. When a positive potential is applied to first and second electrodes 100a and 100b and a negative potential is applied to third and fourth electrodes 100c and 100d, a non-uniform electric field is established within the body which is small at the center of the body and strongest near the first and third sides 93 and 95. Therefore, the change in index of refraction in the electro-optic body is greatest near the first and third sides 93 and 95 and a non-uniform change in the wave front shape of light beam 11 will occur.

FIG. 9 shows a one-dimensional spot size changer utilizing a single body 110 of electro-optic material such as lithium niobate which is in the form of a triangular prism. The body 110 has a first face 111 through which light beam 11 enters, a second face 112 through which light beam 11 emerges from body 110, and a third face 113 having a reflective coating 114. Triangular shaped electrodes 120 are positioned on each of the first and second opposing parallel bases 121 and 122 of the prism. The crystallographic Z axis is oriented normal to the surface of each of first and second bases 121 and 122. When an electric potential is applied between electrodes 120 on first and second bases 121 and 122, the outer most rays of light beam 11 experience a relative phase shift with respect to center rays of light beam 11. In this manner, a non-uniform change in the wave front shape of light beam 11 is achieved. The operation of this triangular prism shaped optical spot size changer is similar to that of the electro-optic light beam deflector described in U. S. Pat. No. 3,485,553 to T. C. Lee, which is assigned to the same assignee as the present invention.

While this invention has been disclosed with reference to a series of preferred embodiments, it should be understood by those skilled in the art that changes in form and detail may be made without departing from the spirit and scope of the invention. For example, it is obvious that many other electrode configurations in addition to those specifically shown are capable of applying a non-uniform electric field which will cause a non-uniform change in a characteristic of the light beam.

The embodiments of the invention in which an exclusive property or right is claimed are defined as follows:

1. An optical memory comprising:
light source means for producing a light beam, the light beam having a beam waist proximate a first plane,
focusing means for forming at a second plane a focused light spot which is essentially an image of the intensity distribution of the light beam at the first plane,
a memory medium upon which information is stored the memory medium being positioned proximate the second plane,
a body of material positioned essentially at the first plane, the body having electric field controllable optical properties capable of altering the intensity distribution of the light beam, and
electrode means for controllably applying a non-uniform electric field to the body such that a nonuniform change in the intensity distribution of the light beam occurs, thereby causing an effective reduction in the size of the beam waist and the focused light spot.

2. The invention as described in claim 1 wherein the body is an electro-optic material.

3. The invention as described in claim 1 wherein the body is an electro-absorptive material.

4. The invention as described in claim 1 wherein the body comprises a right cylindrical body having a cylindrical surface and first and second faces.

5. The invention as described in claim 4 wherein the electrode means comprise:
a first electrode attached to and extending around the cylindrical surface proximate to the first face, and
a second electrode attached to and extending around the cylindrical surface proximate to the second face.

6. The invention as described in claim 4 wherein the right cylindrical body is an electro-optic material having the $42m$ or $43m$ type of point symmetry and further comprising:
polarizer means for providing the light beam with a first polarization direction as it enters the right cylindrical body, and
analyzer means positioned between the body and the focusing means for transmitting that portion of the light beam having the first polarization direction.

7. The invention as described in claim 4 wherein the right cylindrical body is an electro-absorptive material.

8. The invention as described in claim 1 wherein the body comprises a rectangular parallelepiped having first and second faces and first, second, third and fourth sides.

9. The invention as described in claim 8 wherein the electrode means comprise electrodes attached to and extending the length of each of the four sides, the electrodes attached to the first and third opposing sides being adapted to have a first potential applied thereto and the electrodes attached to the second and fourth opposing sides adapted to have a second potential applied thereto, thereby establishing a quadrupolar electric field within the body.

10. The invention as described in claim 9 wherein the body is an electro-optic material having the 3m or 4mm point symmetry, and further comprising:
polarizer means for providing the light beam with a first polarization direction as it enters the body, and analyzer means positioned between the body and the focusing means for transmitting that portion of the light beam having the first polarization direction.

11. The invention as described in claim 8 wherein the body is an electro-absorptive material.

12. In an optical system having a light source for producing a light beam, a memory medium upon which information is stored, and focusing means for forming a focused light spot at the plane of the memory medium, apparatus for controllably changing the size of the focused light spot, the apparatus comprising:

a body of linear electro-optic material positioned between the light source and focusing means, the body having electric field controllable indices of refraction capable of altering the wave front shape of the light beam, electrode means for controllably applying a non-uniform electric field to the body such that a non-uniform change in the wave front shape of the light beam occurs, thereby causing interference of portions of the light beam at the plane of the memory medium and an increase in the size of the focused light spot in a first direction, and beam scanning means for causing relative motion between the light beam and the memory medium in a second direction essentially orthogonal to the first direction.

13. The invention as described in claim 12 wherein the body comprises a rectangular parallelepiped of electro-optic material having first and second faces and first, second, third and fourth sides.

14. The invention as described in claim 13 wherein the electrode means comprises a pair of shaped electrodes adjacent the first and third opposing parallel sides of the body, each of the electrodes comprising a plurality of triangular regions having minimum area at the center of the first and third sides and maximum area near the edges of the first and third sides which border the second and fourth sides.

15. The invention as described in claim 13 wherein the electrode means comprises:

first electrode attached to the first side proximate the first face, second electrode attached to the third side proximate the first face, third electrode attached to the first side proximate the second face, and fourth electrode attached to the third side proximate the second face, the electrodes adapted to have a first potential applied to the first and third electrodes and a second potential applied to the third and fourth electrodes.

* * * * *